April 19, 1932. G. J. MERCER 1,854,210
VEHICLE CLOSED BODY
Filed Feb. 2, 1928
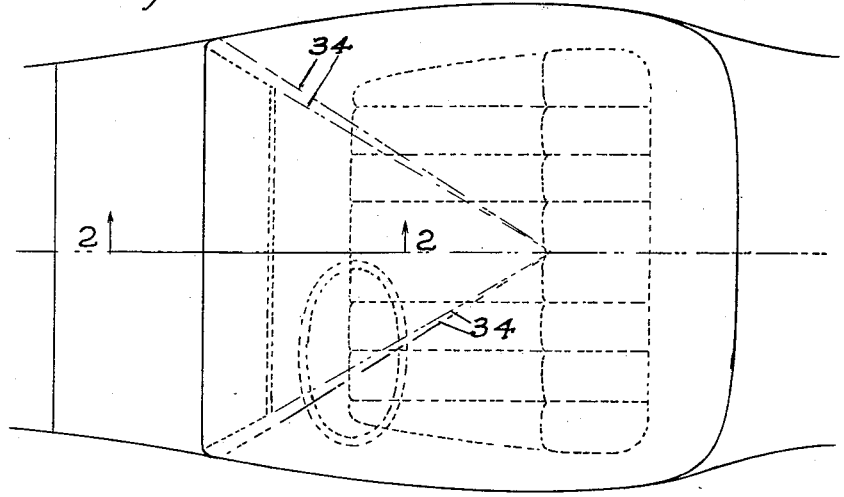
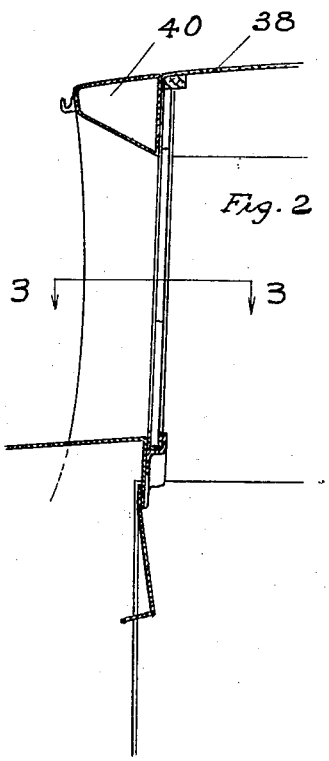
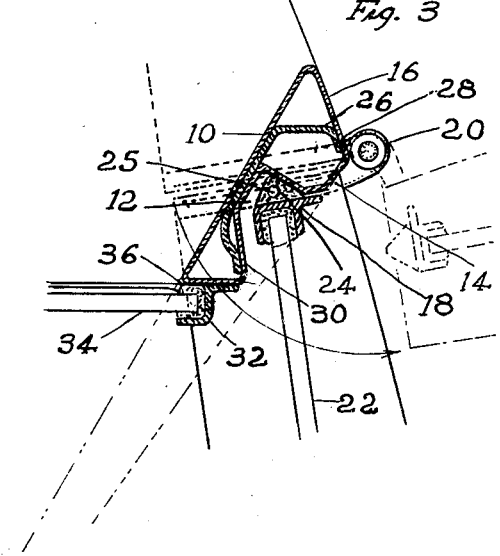
George J Mercer INVENTOR.
BY
Parker & Burton   ATTORNEYS.

Patented Apr. 19, 1932　　　　　　　　　　　　　　　1,854,210

UNITED STATES PATENT OFFICE

GEORGE J. MERCER, OF DETROIT, MICHIGAN, ASSIGNOR OF ONE-HALF TO RALPH J. BURTON, OF DETROIT, MICHIGAN

VEHICLE CLOSED BODY

Application filed February 2, 1928. Serial No. 251,243.

My invention relates to improvements in vehicle closed bodies. It is particularly adapted to increase the visibility of the occupants forwardly of the vehicle.

An object of my invention is to provide a front corner post of minimum width along the line of vision and which is so shaped and arranged as to permit the maximum vision by the occupants without reduction of strength in the corner post.

A meritorious feature lies in the provision of such a corner post which is so shaped as to be elongate in horizontal cross-section and substantially along the line of vision of the driver of the vehicle. The corner posts may well be so constructed and arranged that their major horizontal cross-sectional axes intersect the center line of the body at approximately the rear edge of the front seat.

My corner post is made of a tubular metal structure possessing substantial rigidity or strength. It is so shaped that not only does it increase appreciably the vision of the occupants of the vehicle but it has a linear groove which is adapted to substantially receive the upright window frame member of the door which abuts the corner post so that this upright window frame member does not appreciably obstruct the vision.

Another feature consists in the provision of corner posts constructed as arranged and described wherein the top of the body extends forwardly of the windshield, which windshield is positioned between said corner posts at their rear sides, forming a visor effect forwardly of the windshield between the corner posts.

An additional meritorious feature consists in the provision of a novel type of abutting door frame structure employed in combination with my improved corner post. Other advantages and meritorious features of my invention will more fully appear from the following specification, accompanying drawings and appended claims.

In the drawings:

Fig. 1 is a diagrammatic plan view of a vehicle body embodying my invention.

Fig. 2 is a vertical sectional view taken on the line 2—2 of Fig. 1.

Fig. 3 is a horizontal sectional view taken on the line 3—3 of Fig. 2.

I have illustrated my invention as embodied in a motor vehicle closed body of the coupé type though obviously it is adapted for use in a motor vehicle closed body wherein it is desired to attain the maximum vision of the occupants while preserving strength and rigidity of the body structure.

The invention relates primarily to a novel type of construction and arrangement of the front corner posts and parts associated therewith. My improved corner post is a tubular metal structure which is so shaped as to be elongate in horizontal cross-section substantially along a line corresponding to the line of vision of the driver of the vehicle.

In Fig. 3 the corner post is shown as having a side wall 10 which extends in the same general direction as its opposite side wall 14. The side wall 16 conforms to the general line of the side wall of the body. The side wall 14 is bent inwardly toward the side wall 10 to provide a groove 12, which groove is adapted to substantially receive the upright window frame member 18 of a door which is hinged at 20 to abut the corner post. I have shown this door as having an upright frame member 18 which corresponds to the usually provided door pillar and serves as a runway and support for the slidable glass pane 22.

This upright pane supporting member 18 has a compressible cushion 24 secured to its back which cushion abuts that portion of the body corner post which serves as the jamb face thereof and forms a tight waterproof joint therewith and cushions any shock thereof. This cushion is shown as provided with a linear passageway 25 to indicate its compressibility.

The corner post is reinforced by an inner metal brace member 26. This metal brace member 26 may be welded to the outer wall 16 of the corner post as at 28 and it may be welded thereto at the bottom of the groove 12 and at a point 30. There is secured to the rear face of the corner post an angle section 32 within which is mounted the windshield 34. Suitable packing 36 may be provided within this angle section and similar packing may be provided within the upright door frame section 18.

The opposite faces 10 and 14 of the corner post extend in substantially the same general direction and if the planes thereof were continued as indicated by the dotted lines 34 in Fig. 1, they would intersect the center line of the body at substantially the rear edge of the seat, and the groove 12 substantially receives the upright door frame member 18 so that it falls within these lines and does not additionally obstruct the vision of the driver of the car.

The top 38 of the body has a forward extension or portion 40 which projects forwardly of the windshield between the corner posts and forms what in effect is a visor between said corner posts forwardly of the windshield. This in reality form a pocket forwardly of the windshield between the corner posts.

I claim:

1. A vehicle closed body having a front corner post which supports one end of the windshield and one edge of the front door, said corner post being formed of metal and having its greatest horizontal axis disposed obliquely to the center line of the body and having one side wall bent inwardly toward the opposite side wall forming a channel adapted to substantially completely receive the adjacent upright door pillar and the bottom of which channel is braced from and supported by the opposite side wall of the post.

2. A vehicle closed body having a front corner post which supports one end of the windshield and one edge of the front door, said corner post being formed of sheet metal and having its greatest horizontal axis disposed obliquely to the center line of the body and having one side wall bent inwardly toward the opposite side wall forming a channel adapted to substantially completely receive the adjacent door pillar, said channel being positioned forwardly of that portion of the post which engages and supports the end of the windshield and the bottom of the channel being braced from and supported by the opposite side wall of the post.

3. A vehicle closed body having a front corner post which engages and supports one end of the windshield and one upright pillar of the front door, said post being formed of sheet metal so shaped that the major horizontal axis of the post extends obliquely to the center line of the body and one major side wall of the post is bent inwardly into abutting supporting relationship with the opposite side wall thereof forming a channel adapted to substantially completely receive the adjacent door pillar, said post provided with a second oppositely directed channel which receives the end of the windshield and which is arranged rearwardly and inwardly of the channel which receives the door pillar, said channel being disposed substantially within said major horizontal axis of the post.

4. A vehicle closed body having a front corner post which engages and supports one end of the windshield and one upright pillar of the front door, said post being formed of sheet metal so shaped that the major horizontal axis thereof extends obliquely to the center line of the body and one major side wall thereof extends substantially parallel to said axis and the opposite major side wall thereof is bent inwardly toward the first mentioned major side wall being supported thereby and forming a channel adapted to receive the adjacent upright door pillar, said post being so shaped as to have an upright tubular portion arranged adjacent to each side wall of said channel.

5. A vehicle closed body having a front corner post which engages and supports one end of the windshield and one upright pillar of the front door, said post being formed of sheet metal so shaped that the major horizontal axis thereof extends obliquely to the center line of the body when one major side wall thereof extends substantially parallel to said axis and the opposite major side wall thereof is bent inwardly toward the first mentioned major side wall being supported thereby and forming a channel adapted to receive the adjacent upright door pillar, said post being so shaped as to have an upright tubular portion arranged adjacent to each side wall of said channel and a reinforcing upright channel member arranged within said post and having a part extending into each tubular portion thereof reinforcing the same.

In testimony whereof, I, GEORGE J. MERCER, sign this specification.

GEORGE J. MERCER.